United States Patent
Loh et al.

(10) Patent No.: US 7,850,887 B2
(45) Date of Patent: Dec. 14, 2010

(54) THERMOCOMPRESSION MOLDING OF PLASTIC OPTICAL ELEMENTS

(75) Inventors: Ban P. Loh, Durham, NC (US); Nicholas W. Medendorp, Jr., Raleigh, NC (US)

(73) Assignee: Cree, Inc., Durham, NC (US)

( * ) Notice: Subject to any disclaimer, the term of this patent is extended or adjusted under 35 U.S.C. 154(b) by 366 days.

(21) Appl. No.: 11/440,166

(22) Filed: May 24, 2006

(65) Prior Publication Data

US 2007/0273058 A1 Nov. 29, 2007

(51) Int. Cl.
B29D 11/00 (2006.01)

(52) U.S. Cl. ................................ 264/132; 264/2.4

(58) Field of Classification Search .............. 264/2.7, 264/1.1, 2.4; 206/5.1; 425/808
See application file for complete search history.

(56) References Cited

U.S. PATENT DOCUMENTS

| | | | |
|---|---|---|---|
| 2,722,720 A | 11/1955 | Karniol | |
| 3,871,803 A | 3/1975 | Beattie | |
| 5,965,069 A | 10/1999 | Murata et al. | |

FOREIGN PATENT DOCUMENTS

JP 03039213 A 2/1991

OTHER PUBLICATIONS

International Search Report and Written Opinion for PCT/US2007/011166; Oct. 18, 2007.
International Preliminary Report on Patentability for PCT/US2007/01116 dated Sep. 15, 2008.

Primary Examiner—Christina Johnson
Assistant Examiner—Larry Thrower
(74) Attorney, Agent, or Firm—Myers Bigel Sibley & Sajovec

(57) ABSTRACT

Method of forming a plastic element include dispensing a quantity of a liquid precursor material into a first die mold, positioning a carrier tape on the first die mold above the dispensed liquid precursor material, bringing a second die mold into contact with the carrier tape and the first die mold, and applying pressure to the first die mold and the second die mold. The liquid precursor material may include a liquid silicone.

15 Claims, 5 Drawing Sheets

THERMOCOMPRESSION MOLDING OF PLASTIC OPTICAL ELEMENTS

FIELD OF THE INVENTION

This invention relates to the formation of molded plastic elements, and more particularly to the formation of molded plastic elements using thermocompression molding.

BACKGROUND

Packaged light emitting diodes (LEDs), such as the XLamp® packaged light emitting diode manufactured by Cree, Inc., Durham, N.C., may include optical elements such as lenses arranged to focus and/or direct light emitted by a solid state light emitting device. Because of the high optical power and/or heat that is generated by a solid state light emitting device during operation, it may be desirable for the lens of such a packaged device to be capable of withstanding heat and/or light without degrading.

Small plastic elements may be manufactured through molding processes. However, molded plastic lenses having operating properties suitable for use in packaged LED applications have proven to be incapable of withstanding high temperatures and/or may degrade and lose light transmittance properties when exposed to light having a wavelength of 400 nm or less, which may be present in blue and/or near-UV light. Examples of plastics used for such lenses are PMMA (polymethyl methacrylate), COC (cyclic olefin co-polymer), polymethylpentene, and the like. Such plastic lenses may be formed, for example, through injection molding.

Silicone materials may possess desirable optical and thermal properties for a high performance packaged LED devices, since they may be capable of handling high heat and/or short wavelength light exposure without substantial degradation. However, silicone generally cannot be molded into optical shapes by injection molding as is the case with the thermal plastics mentioned above.

Some silicone materials have been developed that are capable of being molded by liquid injection molding and/or transfer molding. However, in both of these methods, a high percentage of material is wasted, as an excess of material is needed during each molding cycle to fill a cull, or receptacle, for the raw material, as well as a network of runners of the mold-die. During liquid injection molding or transfer molding, material is squeezed by a mold plunger in the cull area, forcing it to flow into runners and through gates that lead to the cavities that form the lens. Excess material in the cull area and the runners may be wasted, increasing the process costs.

In conventional molding techniques, the molded part may include excess material, referred to as "flashing," around a circumference of the part where a seam between the die molds was formed. This flashing is typically removed from the molded part. Similarly, in transfer molding and injection molding techniques, material corresponding to the gate may be removed from the finished part.

The portion of the molded part around the excess material formed by the gate may have an increased level of material stress, which may become distorted when the temperature of the part is elevated. This may be particularly undesirable for an LED package lens since, as the lens heats up during LED operation, the lens may become distorted, which may change the near or far field optical pattern of the package. In addition, the portion of the part around the excess material may be roughened and/or otherwise damaged when the excess material is trimmed. Such distortion and/or damage may adversely affect the optical characteristics of a lens formed through transfer or injection molding, even if the gate is located near an edge of the molded part, and/or may complicate the assembly of the package.

Conventional transfer molding and injection molding techniques may have other drawbacks for molding silicone. For example, cured silicone may bond to metal and/or plastic surfaces. Thus, it may be difficult to use transfer molding to produce molded silicone parts, because the cured silicone may block the gate.

A third method of making a silicone lens is by potting. In this method, liquid resin is dispensed into a metal or plastic mold-cup and is then cured in an oven. This method may be labor intensive, slow and limited to forming incomplete shapes, as a portion of the lens so formed is defined by the liquid level of the curing resin.

A typical setup for injection/transfer molding of a lens is shown in FIG. 1. As shown therein, a mold 10 includes a plurality of lens-shaped cavities 12. Raw material provided in a feed chamber 14 is injected/transferred into the cavities 12 through a plurality of runners 16 and gates 18. The number of lenses that such a system may be capable of producing in a single run may be limited by the length and complexity of the system of runners 16. Furthermore, the lenses produced in such a system may include a gate due to the presence of the runners 16 that may be trimmed from the lenses before they may be used in a package. As noted above, the removal of the gate may result in a rough, uneven and/or stressed location on the resulting lens.

SUMMARY

Some embodiments of the invention provide methods of forming a plastic lens element including positioning a carrier tape on a first die mold including a plurality of lens shaped cavities, dispensing a quantity of a liquid precursor material onto the carrier tape, bringing a second die mold into contact with the carrier tape and the first die mold, and applying pressure to the first die mold and the second die mold to form a sheet of plastic lenses connected at peripheral regions of the lenses. The sheet of plastic lenses is removed from the first die mold, and at least one plastic lens is separated from the sheet of plastic lenses.

The methods may further include increasing a temperature of the dispensed liquid precursor material to thereby at least partially cure the liquid precursor material to form a solid molded element.

The methods may further include at least partially curing the dispensed liquid precursor material to form a solid molded element, separating the first die mold and the second die mold, and removing the solid molded element from the first die mold using the carrier tape. The methods may further include removing the solid molded element from the carrier tape.

The methods may further include separating the solid molded element from any flashing remaining on the solid molded element after removing the solid molded element from the first die mold. Separating the solid molded element from flashing may include punching the solid molded element using a die punch. The die punch may include a hollow tip, and/or may include a tip that may be shaped to conform to a shape of the solid molded element defined by the first die mold.

The solid molded element may include a lens element. The lens element may include an optical feature defined by a shape of the first die mold and/or a shape of the second die mold.

The first die mold may include a plurality of cavities, and forming a solid molded element may include forming a sheet of solid molded elements in the plurality of cavities. The solid molded elements may be connected by flashing. Removing the solid molded element from the first die mold may include removing the sheet of solid molded elements from the first die mold using the carrier tape.

The methods may further include providing a vacuum seal between the first die mold and the second die mold. Providing the vacuum seal may include providing the vacuum seal on the first die mold, and positioning the carrier tape may include positioning the carrier tape above the vacuum seal.

Positioning the carrier tape may include feeding the carrier tape into a space between the first and second die molds along a transverse direction, and the methods may further include dispensing an additional quantity of liquid precursor material into the first die mold after removing the solid molded element from the first die mold and feeding the carrier tape along the transverse direction at least until the solid molded element is moved out from between the first and second die molds.

The methods may further include feeding the carrier tape and the solid molded element into a heater and heating the solid molded element to further cure the solid molded element.

Methods of forming a molded lens according to some embodiments of the invention include positioning a carrier tape on a first die mold including a plurality of lens shaped cavities, dispensing a quantity of liquid silicone onto the carrier tape, bringing a second die mold into contact with the carrier tape and the first die mold, and applying pressure to the first die mold and the second die mold along a first direction. The dispensed liquid silicone is at least partially cured to form a sheet including a plurality of molded lenses. The methods further include separating the first die mold and the second die mold and removing the sheet from the first die mold using the carrier tape. The carrier tape is advanced in a direction transverse to the first direction to move the sheet away from the first die mold, and at least one molded lens is separated from the sheet.

The methods may further include removing the sheet from the carrier tape. Separating at least one molded lens from the sheet may include separating the molded lens from flashing remaining on the molded lens after removing the molded lens from the first die mold.

Positioning the carrier tape may include feeding the carrier tape into a space between the first and second die molds along a transverse direction, and the methods may further include dispensing an additional quantity of liquid silicone into the first die mold after removing the sheet from the first die mold and feeding the carrier tape along the transverse direction at least until the sheet is moved out from between the first and second die molds. The methods may further include feeding the carrier tape and the sheet into a heater and heating the molded lens to further cure the sheet.

Methods of forming a molded lens according to further embodiments of the invention include providing a quantity of precursor material in a first die mold, positioning a carrier tape on the first die mold above the precursor material, and bringing a second die mold into contact with the carrier tape and the first die mold. Pressure is applied to the first die mold and the second die mold along a first direction, and the precursor material is at least partially cured to form a partially cured molded lens. The first die mold and the second die mold are separated, and the partially cured molded lens is removed from the first die mold using the carrier tape. The carrier tape is advanced in a direction transverse to the first direction to move the molded lens into a heater, and the molded lens is further cured in the heater.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
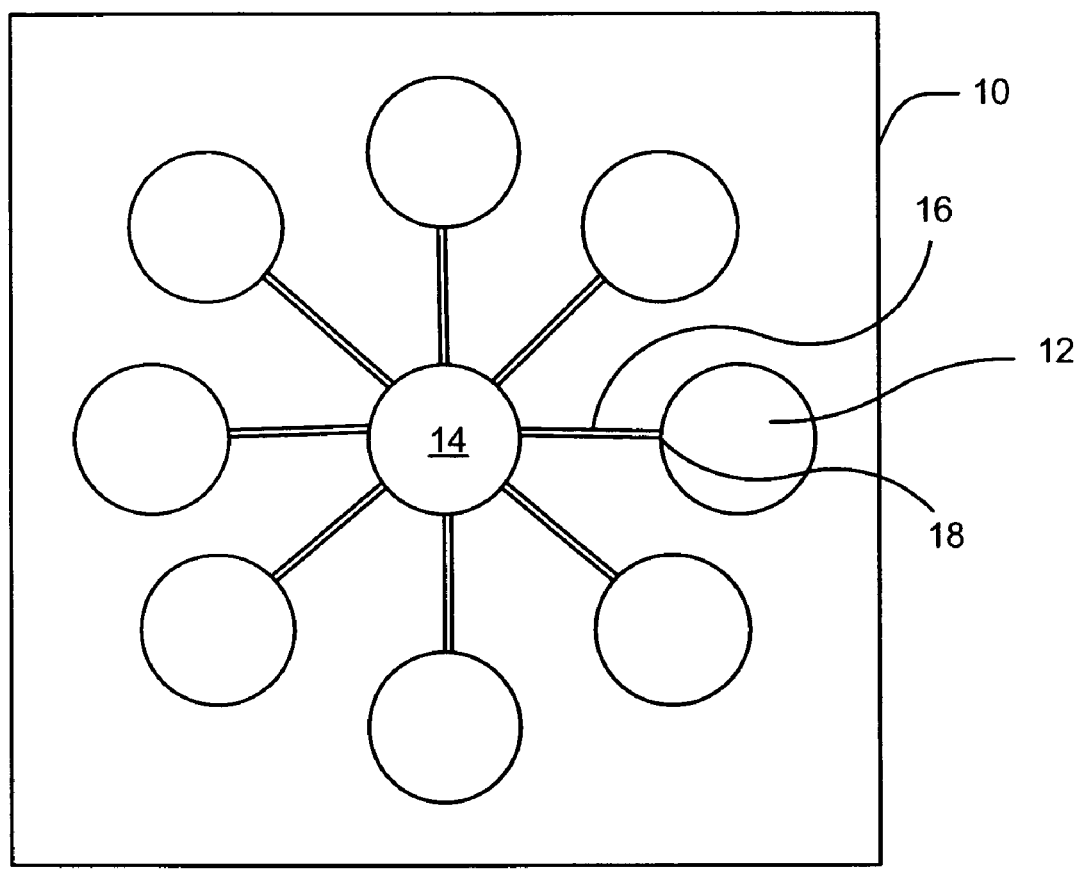
FIG. 1 is a schematic diagram of a conventional injection/transfer molding system for lenses.

The present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element such as a layer, region or substrate is referred to as being "on" another element, it can be directly on the other element or intervening elements may also be present. It will be understood that if part of an element, such as a surface, is referred to as "inner," it is farther from the outside of the device than other parts of the element. Furthermore, relative terms such as "beneath" or "overlies" may be used herein to describe a relationship of one layer or region to another layer or region relative to a substrate or base layer as illustrated in the figures. It will be understood that these terms are intended to encompass different orientations of the device in addition to the orientation depicted in the figures. Finally, the term "directly" means that there are no intervening elements. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the invention are described herein with reference to cross-sectional, perspective, and/or plan view illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as a rectangle will, typically, have rounded or curved features due to normal manufacturing tolerances. Thus, the regions illustrated in the figures are schematic in nature and their shapes are not intended to illustrate the precise shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure and will not be interpreted in an idealized or overly formal sense unless expressly so defined herein.

Figure 2:
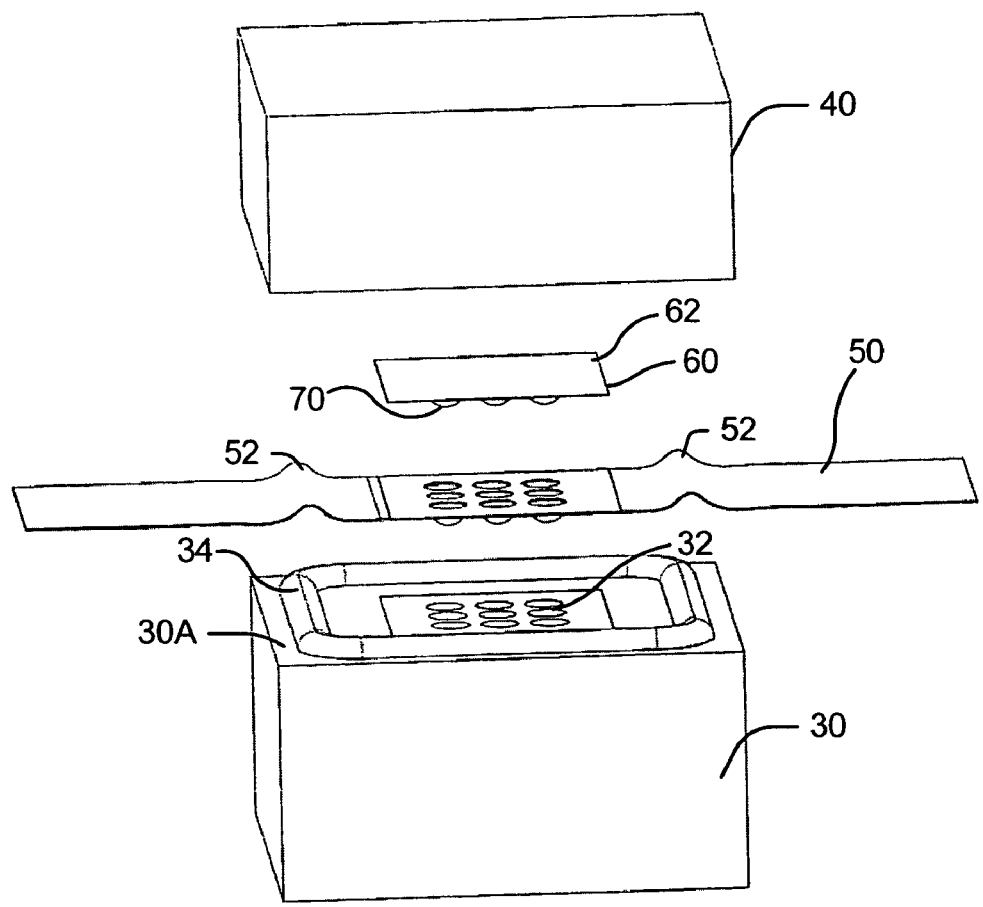
FIGS. 2-3 are exploded views of methods and apparatus for compression molding according to some embodiments of the invention.
Figure 3:
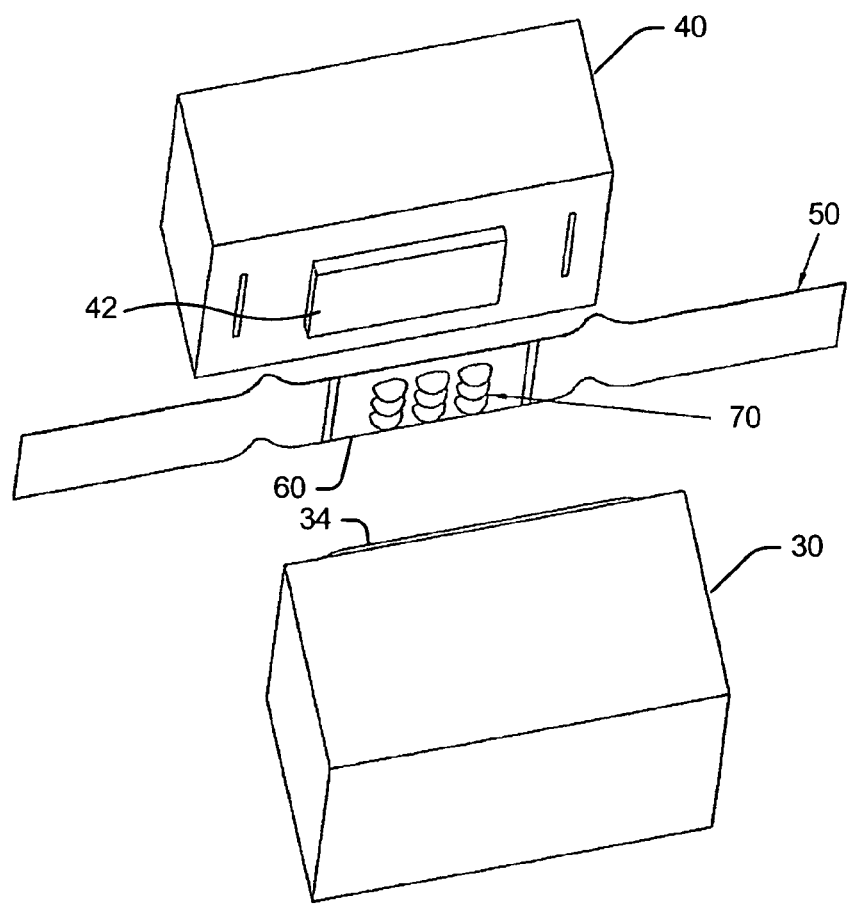

FIGS. 2-3 are exploded views of methods and apparatus for compression molding according to some embodiments of the invention. As shown therein, an apparatus for compression molding includes a first die mold 30 and a second die mold 40. The first die mold includes a plurality of cavities 32 on an upper face 30A thereof. The cavities 32 are shaped to form at least part of the shape of a plurality of corresponding molded parts 70. In the embodiments illustrated in FIG. 2, the first die mold 30 includes nine recesses 32. However, it will be appreciated that the number of recesses 32 in the first die mold 30 may be more or less than nine. In some embodiments, the molded parts 70 may be molded lenses suitable for use in an LED package. In that case, in addition to the general shape of the cavities (e.g., hemispherical, parabolic, etc.) that may define an optical lens, the cavities may include additional optical features for light guiding, spreading, diffusion, directing, etc., as may be desired for a particular application.

A strip of deformable carrier tape 50 is provided between the first die mold 30 and the second die mold 40. The carrier tape 50 may be used to remove and hold a sheet 60 of molded lenses 70 which are connected by flashing formed during a molding operation.

The first die mold 30 also includes a sealing ring 34 on the upper surface 30A thereof that surrounds a central region of the upper surface 30A of the first die mold where the cavities 32 are formed. The sealing ring 34 may allow formation of a vacuum seal between the first die mold 30 and the second die mold 40 when air is pumped out from the mold through one or more vacuum vias (not shown). It will be appreciated, however, that in some embodiments the sealing ring 34 may be formed on a corresponding opposing face of the second die mold 30, may be provided as a separate element, and/or may be omitted altogether.

In order to form a plastic element such as a plastic lens for an LED package, a quantity of a liquid precursor material is dispensed into the cavities 32 of the first die mold 30. The liquid precursor material may include, for example, an uncured liquid silicone material. Controlled dispensing of liquid silicone is well known in the art, and may be accomplished, for example, by positioning a hollow dispensing needle (not shown) above the surface 30A of the first die mold 30 and dispensing liquid silicone through the dispensing needle into the cavities 32. The dispensing system may also be configured to mix (in the case of 2-part liquid formulations) and meter the liquid being dispensed.

Since the locations of the cavities 32 are known, the dispensing needle may be controlled to precisely dispense a desired quantity of liquid silicone directly into the cavities 32. In some embodiments, it may be desirable to dispense some excess liquid silicone in or adjacent to the cavities 32 in order to promote the formation of a flashing 62 around the molded lenses 70.

After a carrier tape 50 is positioned between the first die mold 30 and the second die mold 40, the liquid precursor material may be dispensed into the cavities 32 over the tape 50. The second die mold 40 is then brought into contact with the first die mold 30. In embodiments in which the sealing ring 34 is present, the second die mold 40 may also be brought into contact with the sealing ring 34, such that the sealing ring 34 is pressed between the first die mold 30 and the second die mold 40.

As shown in FIG. 3, the second die mold may include a protrusion 42 that may extend, when the second die mold 40 is pressed together with the first die mold 30, into a central area above the surface 30A of the first die mold 30 surrounded by the sealing ring 34.

Next, pressure may be applied to the first die mold 30 and the second die mold 40 to compress the liquid precursor material into the cavities 32. Furthermore, air may be pumped out from the mold chamber through one or more vacuum vias (not shown) in the first die mold 30. The dispensed precursor material may then be at least partially cured, for example, by heating the material for a suitable period of time at a suitable temperature, by allowing the dispensed material to sit for a suitable period of time at room temperature, by exposure to UV light, with the aid of a catalyst, and/or by other suitable techniques. Curing can be performed in one step and/or multiple steps. In embodiments in which liquid silicone is used as the precursor material, the dispensed material may be at least partially cured after being heated to a temperature of about 150° C. for tens of seconds to several minutes, and may be completely cured after being heated to a temperature of about 150° C. for one to three hours. However, it will be appreciated by those skilled in the art that other time/temperature combinations may be suitable for fully or partially curing dispensed liquid silicone.

The at least partially cured precursor material forms a plurality of molded lenses 70 within the cavities 32. The plurality of molded lenses 70 are connected by the flashing 62 in a sheet 60 that may be removably affixed, as a result of the curing process, to the carrier tape 50.

After separating the first die mold 30 and the second die mold 40, the sheet 60 of molded lenses 70 may be removed from the first die mold 30, for example, by lifting the carrier tape 50 away from the first die mold 30. The carrier tape 50 may then be fed along a path parallel to the surface 30A of the first die mold 30 (i.e. transverse to the direction of relative movement of the first die mold 30 and the second die mold 40) such that the sheet 60 is moved away from the first and second die molds 30, 40, and a fresh (i.e. unused) section of the carrier tape 50 is moved into position above the cavities 32.

A second quantity of liquid precursor material may then be dispensed into the cavities 32, and the operations described above may be repeated to produce another sheet 60 of conjoined molded lenses 70.

As will be appreciated by those skilled in the art, the throughput of such a process may be increased by simply increasing the number of cavities 32 in the upper surface 30A of the first die mold 30, and may not require the design or formation of a complicated series of runners. This may be accomplished by increasing the surface area of the upper surface 30A of the first die mold 30 and/or by increasing the density of placement of the cavities 32 therein.

The throughput of the process may be further increased by only partially curing the molded lenses 70 in situ while the first and second die molds 30, 40 are pressed together. For example, the molded lenses may be partially cured in situ for a time and/or at a temperature sufficient to permit the molded lenses 70 to attain a fixed shape. Curing of the lenses 70 may be completed after they have been removed from the die molds 30, 40.

In order to facilitate the removal of the sheet 60 including the at least partially cured molded lenses 70 from the first die mold 30, it may be desirable to form the first die mold 30 and/or the second die mold 40 with a surface that the cured lenses may not easily stick to. For example, the first die mold 30 may include a Teflon® or silicone coating/lining. It will be appreciated however, that the carrier tape 50 may be formed of a material to which the sheet 60 will removably adhere, and which will also withstand any elevated temperatures that may be used in curing the dispensed liquid. Accordingly, the carrier tape 50 may include a high-temperature plastic.

The carrier tape 50 may deform around the sealing ring 34 to form creases 52 when the first and second die molds 30, 40 are pressed together.

Figure 4:
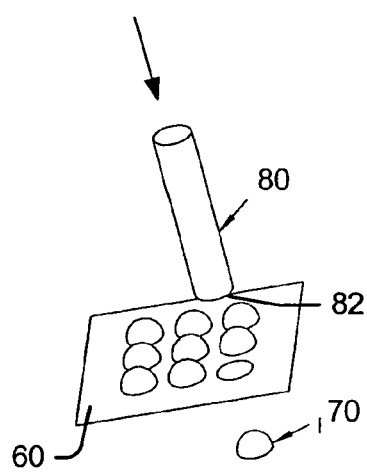
FIG. 4 is a perspective view illustrating the singulation of optical elements formed in accordance with some embodiments of the invention.

FIG. 4 is a perspective view illustrating the singulation of optical elements formed in accordance with some embodiments of the invention. After a sheet 60 of molded lenses 70 has been at least partially cured, the sheet 60 may be removed from the carrier tape 50, for example, by peeling the carrier tape 50 away from the sheet 60, or vice-versa. The individual lenses 70 may then be separated from the sheet 60 (i.e. "singulated") by punching the molded lens 70 using a die punch 80 as shown in FIG. 4. The sheet 60 may be positioned on a support (not shown), and the die punch 80 may be moved in a direction perpendicular to the sheet 60 onto a lens 70 to be singulated. The die punch 80 may have a tip 82 that includes a hollow point, so that the lens 70 may be separated by cutting the flashing surrounding the lens 70 using a circumferential edge of the hollow pointed tip 82. In some embodiments, the tip 82 may include a cavity having a shape similar to the shape of the cavity 32 that defined the shape of the lens 70. Accordingly, the tip 82 may have a cavity that conforms to the shape of the lens 70 as defined by the first or second die mold 30, 40.

In the singulation process, lower edges of the lens 70 may be cut evenly and smoothly by the cutting or punching action of the tip 82.

Figure 5:
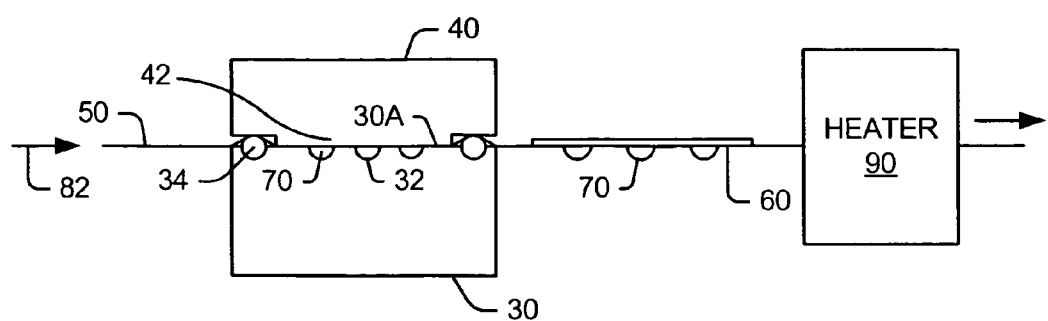
FIG. 5 is a schematic diagram illustrating methods and apparatus for compression molding according to some embodiments of the invention.

FIG. 5 is a schematic diagram illustrating methods and apparatus for compression molding according to some embodiments of the invention. As shown therein, a carrier tape 50 is fed between a first die mold 30 and a second die mold 40 along a direction 82 that is transverse to the relative motion of the first and second die molds 30, 40. After a liquid precursor material, such as a liquid silicone, is dispensed above the carrier tape 50, the first and second die molds 30, 40 are pressed together with the carrier tape 50 such that the carrier tape 50 is between the first and second die molds 30, 40 and above the cavities 32. As shown in FIG. 5, the second die mold 40 may include a protrusion 42 configured to press onto a central region of the upper surface 30A of the first die mold 30 within an area defined by a sealing ring 34. While not illustrated in FIG. 5, the first die mold 30 may also include a corresponding protrusion. For example, the central region of the upper surface 30A of the first die mold 30 could be protruded upwards to facilitate contact with the second die mold 40.

Once a sheet 60 of molded lenses 70 has been formed and at least partially cured, the first and second die molds 30, 40 may be separated, and the sheet 60 may be lifted away from the first die mold 30 by raising the carrier tape 50. The carrier tape 50 may then be advanced in the direction 82 so that an unused section of the carrier 50 may be positioned between the first and second die molds 30, 40. The process may be repeated until a desired number of sheets 60 are formed on the carrier tape 50. In some embodiments, the sheets 60 may be further cured by passing the carrier tape 50 bearing the sheets 60 through a heater 90.

Figure 6:
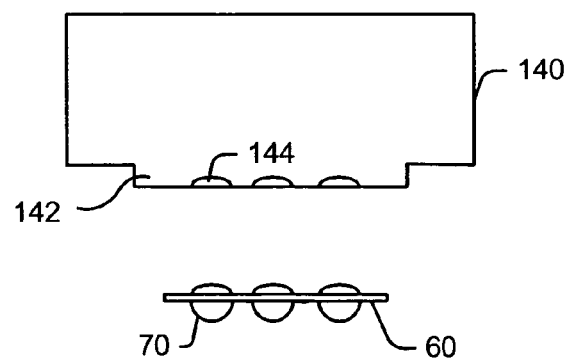
FIG. 6 is a schematic diagram illustrating a die mold and carrier tape according to some embodiments of the invention.

FIG. 6 is a schematic diagram illustrating a second die mold 140 according to some embodiments of the invention. As illustrated in FIG. 6, the second die mold 140 may include cavities 144 which may be located in a protrusion 142 of the second die mold 140 to provide additional shaping of the lens elements 70. Accordingly, when the first and second die molds are pressed together, the liquid precursor material may be shaped by the cavities 144 on a side of the lenses 70 opposite to the first die mold.

Figure 7:
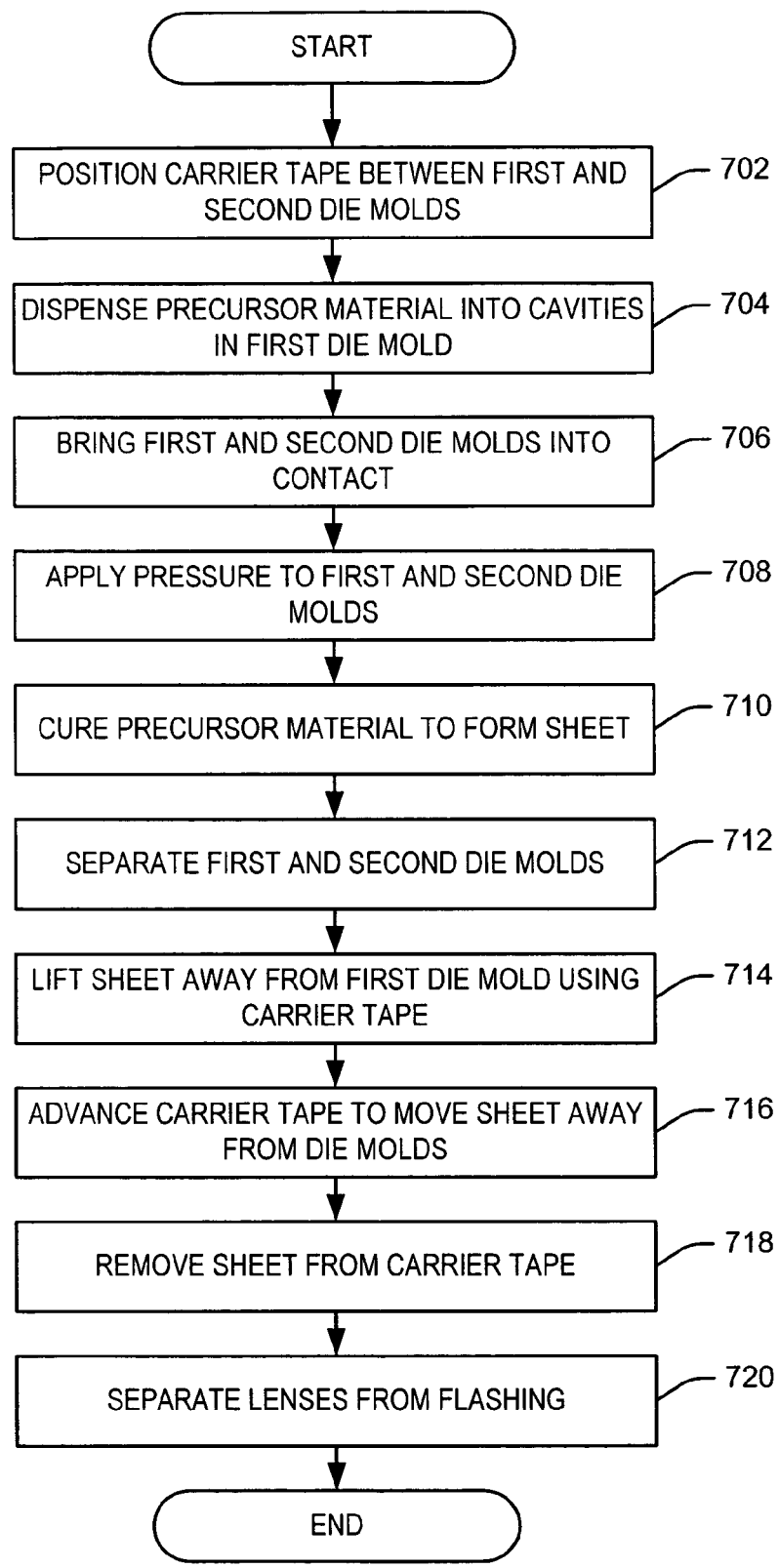
FIG. 7 is a flowchart illustrating operations according to some embodiments of the invention.

Some operations according to embodiments of the invention are illustrated in the flowchart of FIG. 7 in conjunction with FIGS. 2-6. As shown therein, a carrier tape 50 is positioned over the first die mold 30 (block 702). A precursor material such as a liquid silicone is dispensed over the carrier tape 50 (block 704). The first die mold 30 and the second die mold 40, 140 are then brought into contact (block 706), and pressure is applied to the dispensed liquid precursor material through the first die mold 30 and the second die mold 40, 140 (block 708). Air may be pumped out of the cavities of the die molds. The liquid precursor material is then at least partially cured, for example by raising the temperature of the liquid precursor material, to form a sheet 60 of conjoined lens elements 70 (block 710).

After at least partially curing the liquid encapsulant material, the first die mold 30 and the second die mold 40, 140 are separated (block 712), and the sheet 60 is lifted away from the first die mold 30 using the carrier tape 50 (block 714). The carrier tape 50 may then be advanced such that the sheet 60 is moved away from the first die mold 30 and the second die mold 40, 140 (block 716), and the sheet 60 is removed from the carrier tape 50.

The lenses 70 may then be further cured, for example by heating the sheet 60 in a heater 90, before being separated from the flashing of the sheet 60 (block 720). The lenses may be separated from the flashing of the sheet 60, for example, by punching the lenses with a die punch 80.

Methods according to some embodiments of the invention may be advantageous compared to injection/transfer molding systems for a number of reasons. For example, since the precursor material is not forced through a gate, there is no runner system (i.e. the system through which material passes to be transferred into the mold cavity) that produces excess material. Further, since there is no runner system, it may be easier to form die molds having surfaces to which the cured lenses may not easily adhere, for example by coating the die molds with Teflon®. Moreover, methods according to embodiments of the invention may generate significantly less wastage compared to injection/transfer molding techniques.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of forming a plastic lens element, comprising:
   positioning a deformable carrier tape on a first die mold including a plurality of lens shaped cavities;
   dispensing a quantity of a liquid precursor material onto the carrier tape;
   bringing a second die mold into contact with the carrier tape and the first die mold;
   applying pressure to the first die mold and the second die mold and pumping air out of a mold chamber between the first die mold and the second die mold so that the deformable carrier tape is pressed into the plurality of lens shaped cavities between the first die mold and the liquid precursor material to form a sheet of plastic lenses connected at peripheral regions of the lenses;
   opening the first die mold and the second die mold;
   removing the sheet of plastic lenses from the first die mold;
   advancing the deformable carrier tape to move the sheet of plastic lenses away from the first die mold and the second die mold and to move the deformable carrier tape including the sheet of plastic lenses into a heater;
   curing the sheet of plastic lenses in the heater while the sheet of plastic lenses is on the deformable carrier tape; and
   separating at least one plastic lens from the sheet of plastic lenses.

2. The method of claim 1, wherein the liquid precursor material comprises a liquid silicone.

3. The method of claim 1, further comprising increasing a temperature of the dispensed liquid precursor material to thereby at least partially cure the liquid precursor material to form a solid molded element.

4. The method of claim 1, further comprising:
   at least partially curing the dispensed liquid precursor material to form a solid molded element;
   separating the first die mold and the second die mold; and
   removing the solid molded element from the first die mold using the carrier tape.

5. The method of claim 4, further comprising removing the solid molded element from the carrier tape.

6. The method of claim 4, further comprising:
   separating the solid molded element from any flashing remaining on the solid molded element after removing the solid molded element from the first die mold.

7. The method of claim 4, wherein the solid molded element comprises a lens element.

8. The method of claim 7, wherein the lens element includes an optical feature defined by a shape of the first die mold.

9. The method of claim 7, wherein the lens element includes an optical feature defined by a shape of the second die mold.

10. The method of claim 4, wherein the first die mold includes a plurality of cavities, wherein forming a solid molded element comprises forming a sheet of solid molded elements in the plurality of cavities, the solid molded elements being connected by flashing, and wherein removing the solid molded element from the first die mold comprises removing the sheet of solid molded elements from the first die mold using the carrier tape.

11. The method of claim 1, further comprising:
    providing a vacuum seal between the first die mold and the second die mold.

12. The method of claim 11, wherein providing the vacuum seal comprises providing the vacuum seal on the first die mold, and wherein positioning the carrier tape comprises positioning the carrier tape above the vacuum seal.

13. The method of claim 4, wherein positioning the carrier tape comprises feeding the carrier tape into a space between the first and second die molds along a transverse direction, and wherein the method further comprises dispensing an additional quantity of liquid precursor material into the first die mold after removing the solid molded element from the first die mold and feeding the carrier tape along the transverse direction at least until the solid molded element is moved out from between the first and second die molds.

14. The method of claim 13, further comprising feeding the carrier tape and the solid molded element into a heater and heating the solid molded element to further cure the solid molded element.

15. The method of claim 1, wherein pumping air out of the mold chamber between the first die mold and the second die mold comprises pumping air out through a vacuum via in the first die mold.

* * * * *